United States Patent
Litorell et al.

(10) Patent No.: US 6,609,364 B2
(45) Date of Patent: Aug. 26, 2003

(54) METHOD AND ARRANGEMENT FOR CONTROLLING A COMBUSTION ENGINE

(75) Inventors: Martin Litorell, Göteborg (SE); Johan Lindström, Ösmo (SE); Bengt Norén, Mölndal (SE)

(73) Assignee: Volvo Personvagner AB, Göteborg (SE)

( * ) Notice: Subject to any disclaimer, the term of this patent is extended or adjusted under 35 U.S.C. 154(b) by 0 days.

(21) Appl. No.: 09/683,390

(22) Filed: Dec. 20, 2001

(65) Prior Publication Data

US 2002/0053335 A1 May 9, 2002

Related U.S. Application Data

(63) Continuation of application No. PCT/SE00/01224, filed on Jun. 13, 2000.

(51) Int. Cl.$^7$ .............................. F01N 3/20; F02B 17/00
(52) U.S. Cl. ........................... 60/274; 60/285; 123/295
(58) Field of Search ................................ 123/295, 305; 60/274, 284

(56) References Cited

U.S. PATENT DOCUMENTS

| | | | |
|---|---|---|---|
| 4,184,461 A | 1/1980 | Leung | |
| 4,376,427 A | 3/1983 | Mizuno | |
| 4,535,736 A | 8/1985 | Taura et al. | |
| 5,040,506 A | 8/1991 | Yamane | |
| 5,078,107 A * | 1/1992 | Morikawa | 123/295 |
| 5,209,207 A | 5/1993 | Shitani et al. | |
| 5,544,634 A | 8/1996 | Zeller et al. | |
| 5,606,951 A | 3/1997 | Southern et al. | |
| 5,660,157 A | 8/1997 | Minowa et al. | |
| 5,947,079 A * | 9/1999 | Sivashankar et al. | 123/295 |
| 5,970,950 A * | 10/1999 | Shimizu et al. | 123/295 |
| 5,975,045 A * | 11/1999 | Mizuno | 123/295 |
| 6,058,906 A * | 5/2000 | Yoshino | 123/295 |
| 6,092,507 A * | 7/2000 | Bauer et al. | 123/430 |
| 6,145,489 A * | 11/2000 | Kazama et al. | 123/295 |
| 6,240,895 B1 * | 6/2001 | Oder | 123/295 |

FOREIGN PATENT DOCUMENTS

| | | |
|---|---|---|
| EP | 0 964 143 | 12/1999 |
| WO | 98/42970 | * 10/1998 |

* cited by examiner

*Primary Examiner*—Tony M. Argenbright
(74) *Attorney, Agent, or Firm*—Howrey Simon Arnold & White LLP

(57) ABSTRACT

A method for controlling a direct injection combustion engine is disclosed. The method includes generating an air/fuel mixture to the respective cylinders of the engine, and switching between at least a first mode of operation and a second mode of operation of the engine by adjusting the air/fuel mixture supplied to the engine and the amount of time for injecting the mixture. The switch in mode of operation is initiated in connection with operation of the engine with an air/fuel mixture adjusted in such manner that correct operation of the engine is allowed in both modes of operation during the switch. An arrangement for such a control is also disclosed. The method and arrangement provides an improved control between, for example, a stratified and a homogeneous mode of operation in a direct injection engine, wherein stable combustion in the engine and improved comfort for the passengers is achieved.

8 Claims, 2 Drawing Sheets

METHOD AND ARRANGEMENT FOR CONTROLLING A COMBUSTION ENGINE

CROSS REFERENCE TO RELATED APPLICATIONS

The present application is a continuation of International Application No. PCT/SE00/01224, filed Jun. 13, 2000, published Jan. 11, 2001, which claims priority to Swedish Application No. 9902567-8, filed Jul. 5, 1999. Both applications are expressly incorporated herein by reference.

BACKGROUND OF INVENTION

1. Technical Field

The present invention relates to a method for controlling a direct injected combustion engine. More particularly, the invention relates to controlling a direct injected Otto cycle combustion engine two modes of operation wherein the two modes have different air/fuel mixtures supplied to the engine. These operation modes preferably include a first mode for stratified operation and a second mode for homogeneous operation. The invention also relates to a direct injected engine arrangement for such control.

2. Background Information

In vehicles operated by combustion engines, there is a general demand for low emissions of harmful substances in the exhaust gases from the engine. These substances primarily include pollutants in the form of nitrous oxide compounds ("$NO_x$"), hydrocarbon compounds ("HC"), and carbon monoxide ("CO"). For gasoline engines, the exhaust gases are normally purified by an exhaust catalyst that forms part of the exhaust system and through which the exhaust gases flow. In a three-way catalyst known in the art, the major part of the above harmful compounds is eliminated by known catalytic reactions. In order to optimize the function of the catalyst so that it provides an optimal degree of purification for $NO_x$, HC, and CO, the engine is typically operated by a stoichiometric air/fuel mixture, i.e., a mixture where $\lambda=1$.

Furthermore, there is a general demand for reducing vehicle fuel consumption by the engine to the greatest extent possible. To this end, engines have been developed during recent years with new types of combustion chambers in the engine cylinders, in particular so that the engine can operate with increasingly lean fuel mixtures, i.e., where $\lambda \geq 1$. In a DI engine (ie., a direct injected Otto cycle engine), each cylinder combustion chamber in the engine is constructed so that the fuel supplied is highly concentrated at each respective ignition plug. This operating mode is generally termed "stratified" operation. During continuous driving at low or medium-high torque and engine speed, stratified operation provides an operation with a very lean air/fuel mixture, e.g., an operating mode of up to about $\lambda=3$. In this manner, a substantial reduction in fuel consumption is obtained. The engine can also be operated in an "homogeneous" mode of operation with an essentially stoichiometric mixture ($\lambda=1$) or a comparatively rich mixture ($\lambda<1$). This later mode of operation normally prevails during driving situations with comparatively high torques and engine speeds.

During stratified operation, a lean exhaust gas mixture flows through the three-way catalyst. In doing so, the three-way catalyst becomes saturated so that it can not be utilized for reducing $NO_x$ compounds in the exhaust gases. This is due to the fact that it is constructed for an optimal degree of purification for a stoichiometric mixture. For this reason, a conventional three-way catalyst can be combined with a nitrous oxide adsorbent, or $NO_x$ adsorbent or trap, This adsorbent or trap is known per se for adsorbing $NO_x$ compounds, eg., in the exhaust gases from a combustion engine. In this manner, the $NO_x$ adsorbent can be utilized to compliment a conventional three-way catalyst. This can be done either as a separate unit upstream of the three-way catalyst or as an integral part of the three-way catalyst, i.e., together with the catalytic material of the three-way catalyst. In the latter, an integrated component in the form of a $NO_x$ adsorbing exhaust catalyst is formed.

The $NO_x$ adsorbent is constructed so that it takes up (adsorbs) $NO_x$ compounds in the exhaust gases when the engine is operated by a lean air/fuel mixture and gives off (desorbs) the $NO_x$ compounds when the engine is operated by a rich air/fuel mixture during a certain time period. Furthermore, the $NO_x$ adsorbent has the characteristic of being able to adsorb $NO_x$ compounds only up to a certain limit, i.e., it is eventually "filled", reaching an adsorption limit. In this situation, the $NO_x$ adsorbent must be regenerated, i.e. it must be desorb and release the accumulated $NO_x$ compounds. If a conventional three-way catalyst is arranged downstream of a $NO_x$ adsorbent, or if the three-way catalyst is formed as an integral part of a $NO_x$ adsorbent, the desorbed $NO_x$ compounds can be eliminated by means of the three-way catalyst, provided that the catalyst has reached its ignition temperature.

A $NO_x$ adsorbent can be regenerated by providing a comparatively rich exhaust gas mixture flow through the $NO_x$ adsorbent becomes during a certain time period of approximately a few seconds. This is accomplished by operating the engine in the homogeneous operating mode during this time period, wherein the engine runs with a comparatively rich air/fuel mixture. By doing so, the $NO_x$ adsorbent is "emptied" so that it can subsequently adsorb $NO_x$ compounds for a time frame that lasts until the adsorbent is saturated and a new regeneration is needed.

It is known to switch between stratified and homogeneous mode by adjusting the air/fuel mixture supplied to the engine and the length of time for injecting the mixture. This switch is normally initiated due to the vehicle driver requesting a change in torque from the engine. This request can be provided by detecting the position of the engine's accelerator pedal. The vehicle includes a computer based control unit that, depending on the required torque, sees that a suitable air/fuel mixture is fed to the engine depending on, for example, whether a stratified or a homogeneous operation is required, or the required torque and engine speed of the engine.

In addition to a driver-initiated switch from an operating mode such as from stratified to homogeneous operation, the engine must also be able to switch to the homogeneous mode of operation in a compulsory manner (i.e., regardless whether the prevailing driving situation corresponds to homogeneous operation or not) when the control unit has estimated or determined that the $NO_x$ adsorbent needs to be regenerated. This requirement typically occurs after a certain time period has passed from a previous regeneration, or after a certain amount of $NO_x$ compounds has been fed into the $NO_x$ adsorbent, filling when the $NO_x$ adsorbent. A control unit for providing this type of operation is provided with a suitable strategy for switching the combustion engine between homogeneous and stratified operation based on the amount or degree of throttle application and engine speed, and considering whether $NO_x$ regeneration is necessary.

However, in previously known systems for switching a direct injected engine between stratified and homogeneous operation, a problem can occur when this mode switch happens while operating the engine with an air/fuel mixture composition that is disadvantageous for the required operating case. This is because each operating case of the engine requires a certain optimized air/fuel mixture. For example, a switch to a rich, stratified mode of operation can result in undesired carbon deposits in the engine. Furthermore, a switch to a lean, homogeneous operating mode results in an unstable combustion. This, in turn, can result in loss of torque or misfire of the engine.

The problem regarding disadvantageous air/fuel mixtures (i.e., disadvantageous lambda values) for each operating mode can per se be solved by adjusting the fuel amounts to the engine, thereby achieving a suitable lambda value. However, such a procedure can negatively impact the torque of the engine. Obviously, such an impact can affect the comfort or drivability of the vehicle, causing a "jerk" for the passengers therein.

Accordingly, there is a need for a method of controlling a direct injection combustion engine that provides for a switch in operation between stratified and homogeneous modes without negatively affecting the drivability of the vehicle or engine torque. This method should further provide an optimized air/fuel mixture that minimizes negative exhaust emissions.

SUMMARY OF INVENTION

The present invention provides an improved method for controlling a combustion engine. In particular, the invention provides an optimized switch between at least two operating modes in a direct injection engine. Preferably, the modes are the homogeneous and stratified operating modes. The method permits the mode switching to occur while adjusting the air/fuel mixture so that correct operation of the engine happens in both modes of operation during the switch. The present invention also provides an arrangement that includes a generator for generating an air/fuel mixture to the engine cylinder(s), a means or control unit for switching between at least two modes of operation by adjusting the air/fuel mixture supplied to the engine and the amount of time for injection the mixture. The arrangement is such that the operating switch is initiated when the engine is provided with an air/fuel mixture adjusted so that correct operation of the engine occurs in both operating modes during the switch.

The invention relates to a method for controlling a direct injected, or DI combustion engine. The method includes generating an air/fuel mixture to the respective cylinders of the engine, and switching between at least a first operating mode and a second operating mode of the engine by adjusting the air/fuel mixture supplied to the engine and the amount or length of time for injecting the mixture. The method further includes initiating the operating mode switch in connection with operating the engine with an air/fuel mixture that is adjusted so that correct operation of the engine is allowed in both operating modes during the switch.

By using the invention, several advantages are accomplished. Primarily, the time for switching between the various operating modes is selected so that there is no need to correct the fuel amounts in order to achieve an advantageous or required lambda value. According to the invention, the switch between various operating modes is adjusted so that a constant or stable combustion in the engine is maintained during the entire switch between the prevailing operating modes. Furthermore, with the invention, a switch between the various operating modes is accomplished without any noticeable torque changes in the engine. This is advantageous with respect to the comfort of the passengers of the vehicle. Also, the emissions of the engine can be reduced.

According to the invention, the lambda values corresponding to a required air/fuel mixture to the engine are calculated continuously for any of the possible modes of operation and for the requested mode of operation for the engine, both before and after a switch. In this connection, the term "$NO_x$ adsorbing exhaust catalyst" used hereinafter refers to an integrated component having $NO_x$ adsorbing material, as well as material that functions as a conventional three-way catalyst. Further, the term "mode of operation" or "operating mode", refers to operation of a direct injected combustion engine according to a predetermined amount or length of time for injecting fuel and igniting an air/fuel mixture. For example, an operating mode of a DI engine includes stratified and homogeneous modes of operation.

In this connection, the term "fuel control" can refer to a nominal fuel control, wherein air and fuel are dosed into the engine in predetermined amounts during the prevailing driving condition (e.g., depending on the engine speed and the required torque). The term "fuel control" can also refer to an air-based fuel control, wherein air is dosed into the engine according to a predetermined amount during prevailing driving condition (e.g., depending on engine speed and the requested torque) and fuel is dosed into the engine according to the amount of inflowing air.

In one embodiment of the invention, the switch from one operating mode to another is carried out at a lambda value that corresponds to a required fuel amount and an amount of inflowing air to the engine reaching a predetermined limit value.

This embodiment can include stratified and homogenous operating modes. Further, the limit value selected can correspond to one that provides a stable combustion in the engine without any substantial torque changes during the switch.

The embodiment can further include initiating the switch between nominal and air-based fuel control when the lambda value reaches a second predetermined limit value. Preferably, this second limit value is selected so that substantially no additional torque from the engine is provided during the switch of fuel control. Further, both limit values are preferably separated from each other.

In another embodiment of the invention, the switch is initiated based upon a driver-generated changed in required torque from the engine.

In a further embodiment of the invention, the engine is arranged in connection with a $NO_x$ adsorbing exhaust catalyst found in the exhaust system connected to the engine. In this embodiment, a compulsory switch in operating modes is initiated when $NO_x$ regeneration of the catalyst is required.

BRIEF DESCRIPTION OF DRAWINGS

The invention will be further described in the following with reference to a preferred embodiment and to the annexed drawings, in which.

DETAILED DESCRIPTION

Figure 1:
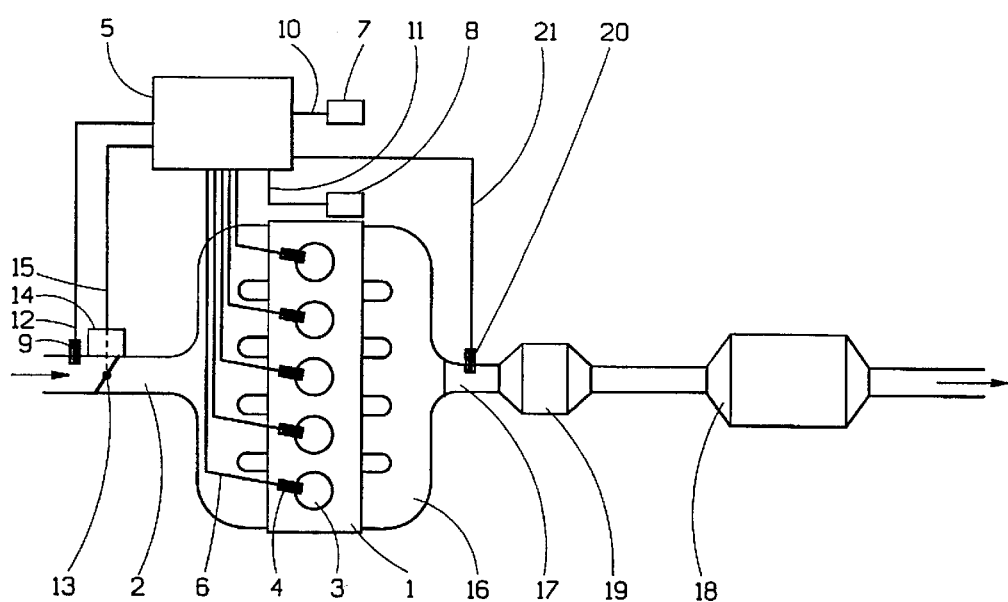
FIG. 1 is a schematic diagram of an arrangement in which the present invention can be utilized.

FIG. 1 is a schematic illustration of an arrangement according to the present invention. According to a preferred embodiment, the invention is arranged in connection with a DI combustion engine 1, i.e., an engine of the direct-injected Otto cycle engine type, where the fuel injected to the engine 1 is adapted for at least two modes of operation with different amounts of air and fuel supplied to the engine 1 and a variable amount of time for injecting the fuel and for igniting the air/fuel mixture.

Preferably, the engine 1 can be set in a "stratified" operating mode. In this mode, the fuel supplied to the engine is concentrated in the respective combustion chamber of the engine so that the engine can be operated by a very lean air/fuel mixture during certain predetermined operating cases. This mixture should correspond to a lambda value of about $\lambda=3$. In the stratified operating mode, fuel is injected into the engine 1 so that it is partially mixed (i.e., non-homogeneously) with air, forming a small "cloud" of fuel and air. Surrounding this partial mixture is substantially clean air. As such, ignition of a very lean mixture having a lambda value of approximately $\lambda=3$ can occur.

Comparing this stratified operation with a stoichiometric mixture where $\lambda=1$, in the stratified operation three times as much air is supplied with the same amount of fuel. By such operation, considerable fuel savings are provided compared with engines which are operated by a stoichiometric mixture, or where $\lambda=1$.

Furthermore, the engine 1 can preferably be set in a "homogeneous" mode of operation during certain operating cases involving comparatively high torques and engine speeds. In this operating mode, a stoichiometric or comparatively rich air/fuel mixture is supplied to the engine 1. In this case, this mixture in contrast to the cloud mixture in the stratified mode of operation is substantially uniformly distributed in the combustion chamber.

Following, an embodiment of the invention is described wherein the engine 1 is operated either in a stratified or a homogeneous manner. However, the invention is not limited to merely these two modes of operation. For example, the engine 1 can be operated in a homogeneous, lean mode of operation, based on the homogeneous mode of operation described above wherein $\lambda=1$, but where the air/fuel mixture is comparatively lean, or approximately $\lambda=1.2$ to about 1.3. This is made possible by bringing forward the ignition angle for ignition of the air/fuel mixture. The reason for this is that a relatively lean, homogeneous mixture burns more slowly than a homogeneous mixture with $\lambda=1$.

The engine 1 is supplied with inflowing air via an air inlet 2 in a conventional manner. Furthermore, the engine 1 is provided with a number of cylinders 3 and a corresponding number of fuel injectors 4. The respective injector 4 is connected to a central control unit 5 via an electrical connection 6. Preferably, the control unit 5 is computer based and adapted to control the fuel supply to each injector 4 with fuel from a fuel tank (not shown) in a known manner so that a constantly adapted air/fuel mixture is fed to the engine 1. The engine 1 according to the embodiment is provided with "multi-point" injection, where the correct amount of fuel to the engine 1 can be supplied individually to the respective injector 4 in a known manner.

During operation of the engine 1, the control unit 5 controls the air/fuel mixture to the engine 1 so that it, in every given moment, is adapted to the current operating mode. The control of the engine 1 occurs in a substantially known manner dependent on various parameters reflecting the operating mode of the engine 1 and the vehicle in question. For example, the engine control can occur based on the current amount of throttle application, engine speed, the amount of air injected into the engine, and the oxygen concentration in the exhaust gases. Accordingly, the engine 1 can be provided with various indicators such as a position indicator 7 for indicating or detecting the vehicle's accelerator pedal (not shown), an engine speed indicator 8 for detecting engine speed and an air flow meter 9 for detecting of the amount of air supplied to the engine 1. These indicators can be connected to the control unit 5 via corresponding electrical connections 10, 11 and 12, respectively. Furthermore, the system includes a gas throttle 13, which preferably is electrically controllable and provided with a controllable shifting motor 14. The gas throttle 13 can be set with the motor 14 in a certain desired position so that a suitable amount of air is fed into the engine 1 based on the current operating mode. In order to accomplish this, the shifting motor 14 is connected to the control unit 5 via an additional connection 15.

Accordingly, the engine 1 according to the invention is able to assume several different operating modes, each having specific air/fuel mixtures, injections times and ignition times. In this case, the control unit 5 is able to change between the various modes of operation depending on various factors such as the driving situation, the load and the engine speed.

The engine 1 shown in the drawing is a five-cylinder engine. However, it should be recognized that the invention can be used in engines having various numbers of cylinders and various cylinder configurations. Preferably, the injectors 4 are those in which the fuel is directly injected into the respective cylinders 3.

During engine operation, exhaust gases are directed out from the cylinders 3 via a branch pipe 16 and on to an exhaust pipe 17 connected to the branch pipe 16. Preferably, a $NO_x$ adsorbing exhaust catalyst 18 is provided further downstream along the exhaust pipe 17. This exhaust catalyst is preferably constructed of a three-way catalyst integrally formed with a $NO_x$ adsorbent. The exhaust catalyst is a type known per se and is adapted to adsorb $NO_x$ compounds that flow out from the engine 1 via the exhaust pipe 8. The exhaust catalyst 18 is comprised of an integrated unit that includes $NO_x$ adsorbing material and a precious metal that functions as a per se conventional three-way catalyst. Herein, the term "$NO_x$ adsorbing exhaust catalyst", or "exhaust catalyst", is used to describe such an integrated component. In another embodiment, the $NO_x$ adsorbent can be a separate component in connection with a three-way catalyst. Regardless of the form selected, the $NO_x$ adsorbent 18 is schematically indicated in the drawing as a single unit.

Furthermore, the engine 1 can be connected to a pre-catalyst 19 located upstream of the exhaust catalyst 18. The pre-catalyst 19 is particularly adapted for rapid heating during cold starts of the engine 1 in order to rapidly activate the catalytic coating. This provides a considerable elimination of HC, CO, and $NO_x$ compounds in the exhaust gases, particularly during low idle flows. Also, due to the fact that the flowing exhaust gases can be rapidly heated by the pre-catalyst 19, a comparatively short ignition time is provided for the subsequent exhaust catalyst 18. In other words, a comparatively short time passes until the exhaust catalyst 18 has been heated to a temperature at which it is capable of reducing a predetermined part of the harmful substances in the exhaust gases. This results in a more effective exhaust purification for the engine 1. This improvement is particularly useful during cold starts. Thus, the exhaust gases from the engine 1 flow through the exhaust pipe 17, through the pre-catalyst 19 and the exhaust catalyst 18 and then further out into the atmosphere.

During homogeneous operation of the engine 1, i.e. during essentially stoichiometric driving conditions ($\lambda=1$), the exhaust catalyst 18 functions as a conventional three-way catalyst for eliminating hydrocarbons, carbon monoxide and nitrous oxide compounds. During lean modes of operation ($\lambda > 1$) within a certain temperature window, preferably a temperature window of about 250° C. to about 450° C., the major portion of $NO_x$ compounds emitted from the engine 1 is adsorbed by the $NO_x$ adsorbing material in the exhaust catalyst 18.

Additionally, the arrangement according to the invention can include a sensor 20 for detecting the oxygen concentration in the exhaust gases. Preferably, the sensor 20 is a linear lambda probe that is connected to the control unit 5 via an electrical connection 21. Alternatively, the sensor may be a binary probe. Preferably, the sensor 20 is placed in the exhaust pipe 17 upstream of the pre-catalyst 19. However, other locations are possible, such as between the pre-catalyst 19 and the exhaust catalyst 18. In a manner known per se, the sensor 20 generates a signal that corresponds to the oxygen concentration in the exhaust gases. This signal is fed to the control unit 5 via the electrical connection 21 and is used in controlling the air/fuel mixture to the engine 1.

The function of the invention will now be described in detail. Generally, it is desirable that the engine 1 provides a desired torque as quickly as possible while emissions from the engine 1 are minimized. During relatively low torque and low engine speeds, the engine 1 is driven in a stratified operation with a very lean air/fuel mixture. During a comparatively high torque and high engine speeds, the engine 1 is driven in a homogeneous mode of operation, i.e., with a stoichiometric or substantially stoichiometric mixture. However, as mentioned above, the invention is not limited to these two operating modes but may also be operated in other modes such as in a lean, homogeneous or a rich, homogeneous manner. The choice of operating mode occurs based on predetermined values that are stored in a memory unit in the control unit 5. Based on the current engine speed, fixed by the engine speed indicator 8, and the required torque for the engine 1, which can be determined based on the position of the accelerator pedal as indicated by the level indicator 7, the control unit 5 can determine what operating mode the engine 1 should be placed in, such as the stratified or homogeneous operating mode.

In order to adjust to the required mode of operation, a value such as the current amount of air flowing into the engine may alternatively be utilized.

The switch between stratified and homogeneous operation can also be compulsory due to a demand to regenerate the exhaust catalyst 18. This can occur in the following manner. When the engine 1 is operated in a stratified manner, i.e., with a lean air/fuel mixture, the exhaust gas mixture flowing through the exhaust pipe 17 and reaching the exhaust catalyst 18 is also lean. According to known principles, the major portion of $NO_x$ compounds present in the exhaust gas mixture is adsorbed by the exhaust catalyst 18. After driving with a lean exhaust gas mixture for a certain period of time, typically about one to about minutes, the exhaust catalyst 18 is filled, implying that the exhaust catalyst 18 can no longer absorb $NO_x$ compounds from the exhaust gas mixture to the same extent as before. At this point, the exhaust catalyst 18 must be regenerated. As described above, the demand for regeneration can be determined by control unit 5. In this case, the control unit 5 sets the engine 1 to its homogeneous operating mode. This provides a relatively rich exhaust gas mixture through the exhaust catalyst 18 for a certain time period, e.g., a few seconds. In doing so, $NO_x$ compounds previously adsorbed by the exhaust catalyst 18 are desorbed, so that the catalyst once again is allowed to adsorb $NO_x$ compounds for a certain time period lasting until it is necessary with to regenerate the catalyst again. When the $NO_x$ compounds are desorbed from the exhaust catalyst 18, they are also reduced by the catalytic coating that is an integrated part of the exhaust catalyst 18.

The adsorbed $NO_x$ compounds can be directly reduced without an intervening desorption if the exhaust catalyst is one that is constructed as an integrated three-way catalyst and a $NO_x$ adsorbent.

Preferably, the control unit 5 calculates those times when it is suitable to regenerate. The determination of the times is dependent on, among other things, the exhaust catalyst 18 and its storage capacity for $NO_x$ compounds and its degree of transformation.

The exhaust catalyst storage capacity is also affected by possible ageing and deactivation due to sulfur compounds. When an excessive amount of sulfur has accumulated in the exhaust catalyst 18, sulfur regeneration must be carried out. This can occur based on techniques known to one skilled in the art and therefore is not described in detail here.

The control unit 5 provides suitable fuel control of the engine 1, i.e., adjustment of an air/fuel mixture in a suitable manner based on the current operating mode at a given driving situation or condition. More precisely, the control unit is able to provide either nominal fuel control, wherein set values regarding the amount of air and fuel to the engine are determined according to predetermined amounts in a given driving situation (e.g., depending on the engine speed of the engine and its required torque), or air-based fuel control, wherein air is dosed into the engine according to a predetermined amount considering the current driving situation (e.g., depending on the engine speed of the engine and its required torque) and fuel is dosed into the engine according to the current amount of air.

The amount of fuel provided to the engine can be changed in a moment, whereas the amount of air provided to the engine encounters a greater inertia during possible changes. During lean driving situations, e.g., stratified operation, the engine torque depends only on the amount of fuel injected. Small changes in the amount of air do not affect the torque since there is already an excess of air. For this reason, only a nominal fuel amount is used. However, during stoichiometric or homogeneous operation (ie., $\lambda \approx 1$), exact proportions between the amount of fuel and air are required in order to minimize emissions. In order to accomplish this, a certain amount of air is provided for a given set value. However, it takes a certain amount of time before this air arrives. Therefore, in order to minimize emissions from the engine, an air-based fuel control is utilized. In this type of control, the amount of air in a subsequent piston stroke is estimated based on the pressure in the induction pipe and the measured amount of air before the gas throttle 13. Next, with the control unit 5 an amount of fuel corresponding to the amount of air is injected into the respective cylinder 3.

Figure 2:
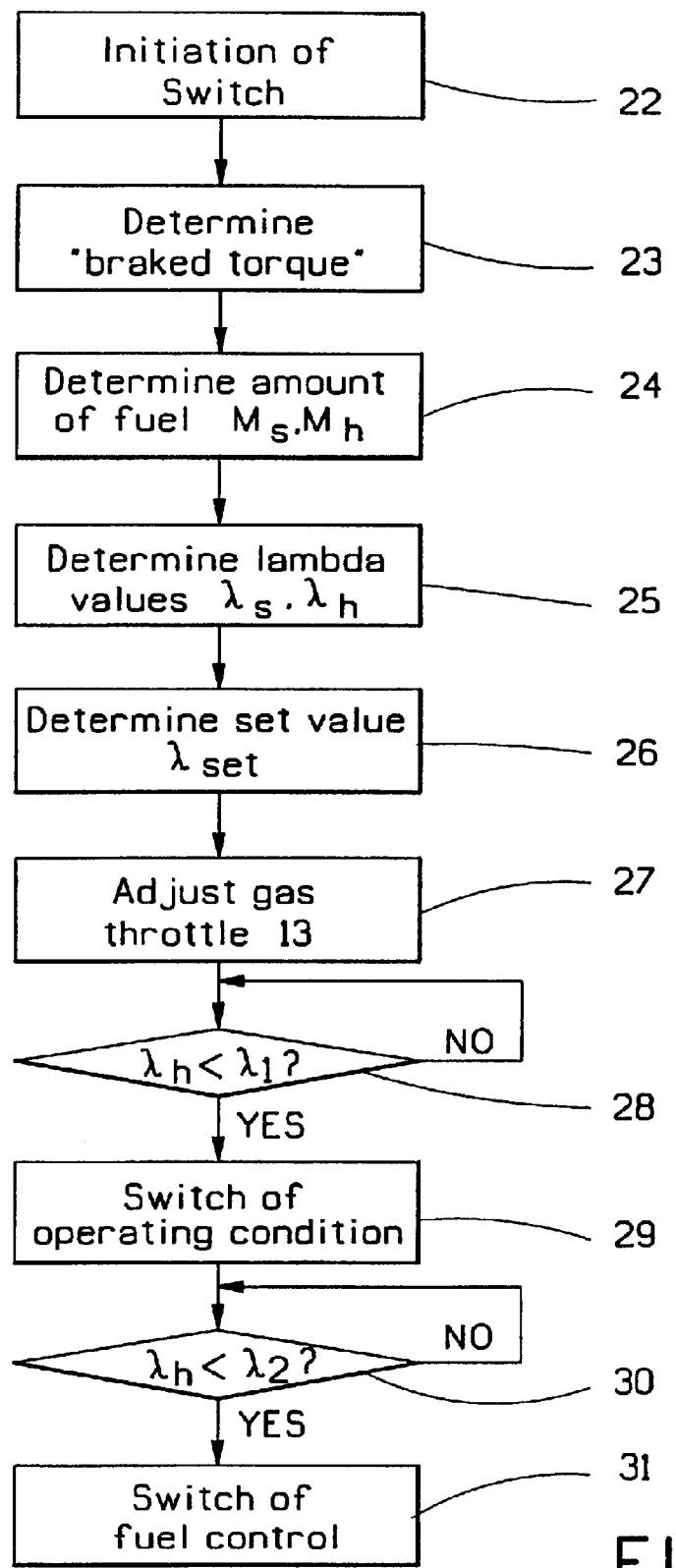
FIG. 2 is a simplified flow chart describing the function of the invention.

FIG. 2 shows a simplified flow chart describing the function of the invention in connection with switching from the stratified to the homogeneous operating mode. Initially, it is assumed that the engine 1 is operated in the stratified mode of operation corresponding to a relatively low torque and a relatively low engine speed. As described above, the engine 1 generates a lean exhaust gas mixture in this condition.

According to the invention, both an optimized occasion for switching modes, i.e., switching from stratified to homogeneous in the current case requiring a change in the injection time and the amount of fuel supply, and an optimized occasion for switching between nominal and air-based fuel control is initiated.

Should the driver while driving requests an increase in torque from the engine, necessitating a switch from stratified to homogeneous operating mode, this normally corresponds to a change in the position of the accelerator pedal. This is detected by the above-mentioned position indicator 7. The control unit 5 calculates the required "braked torque" (step 23) of the engine 1, i.e., the resulting output torque of the engine 1.

Next, the calculated value of the required braked torque is compensated by the control unit 5 based on estimated pump and friction losses in the engine 1. These losses can be estimated based on the engine coolant temperature, which in turn can be determined by a (not shown) temperature indicator for the coolant. Thus, a compensated, or "indicated", torque is provided based on the braked torque.

Next, in step 24, based on the compensated torque, the control unit 5 determines a nominal amount of fuel $M_s$ and $M_h$, respectively, for the stratified and homogeneous operating modes, respectively. This is determined by means of tables which are stored in advance in the control unit 5 and which indicate a connection between the compensated torque and said fuel amounts $M_s$, $M_h$ for each mode of operation.

From values concerning the nominal fuel amounts $M_s$, $M_h$ and a value for the amount of air flowing into the engine 1 (determined by the air flow meter 9), lambda values $\lambda_s$ and $\lambda_h$, for the stratified and homogeneous operating modes, respectively, are determined (step 25). According to the invention, both of these lambda values $\lambda_s$, $\lambda_h$ are calculated simultaneously. Also, should the occasion arise, lambda values corresponding to all other possible modes of operation of the engine are calculated. Thus, determination of the two lambda values $\lambda_s$, $\lambda_h$ occurs continuously both before and after each mode switch of the engine 1.

In step 26, a set value $\lambda_{set}$ for the air/fuel mixture required in the requested mode of operation is determined, i.e., in the homogeneous operation. Accordingly, the control unit 5 is provided with tables indicating suitable set values $\lambda_{set}$ for each driving situation and operating mode. For example, the set value $\lambda_{set}$ in a homogeneous operating mode is approximately 1. In a stratified mode of operation, the set value is approximately 1.5 to about 3, depending on the driving situation.

Depending on the prevailing calculated set value $\lambda_{set}$ (i.e., the value that prevails after the switch to the homogeneous operating mode) and the prevailing nominal fuel amount in the requested operating situation (i.e., the homogeneous fuel amount $M_h$ as described above), the gas throttle 13 (cf. FIG. 1) is also activated for adjustment of a homogeneous amount of air (step 27). Since a mode switch has now been requested, the gas throttle 13 begins to readjust.

Due to inertia encountered in adjusting the required amount of air, it takes a certain time (approximately a tenth of a second) until the set value $\lambda_{set}$ is reached. This results in a gradual change of the prevailing lambda value $\lambda_h$. During a switch from a stratified to a homogeneous mode of operation, the lambda value $\lambda_h$ gradually drops from a value of about 2 to about 3 to the selected set value $\lambda_{set}$, which, as mentioned above, is approximately 1 during a switch to the homogeneous mode of operation.

The change in the amount of air to the engine does not occur instantaneously, but rather takes a certain amount of time to change the amount of air to the homogeneous amount of air in order to reach the determined set value $\lambda_{set}$.

Therefore, the mode switch can not begin until the amount of air has been changed to such an extent that correct operation of the engine occurs in both prevailing modes of operation during a certain short time period.

As mentioned above, there is, in connection with prior art, a risk of the engine operating at a disadvantageous lambda value or the fuel amount being corrected temporarily so that a suitable lambda figure is reached, affecting the torque. With the invention, these drawbacks can be avoided. In order to accomplish this, a mode switch cannot occur until a certain limit condition has been fulfilled. This limit condition can be expressed either as a maximum lambda value that occurs in the homogeneous operating mode, or as a minimum lambda value that occurs in the stratified operating mode. Since it can be assumed that the consequences will be more severe if the engine is operated too lean in a homogeneous mode of operation than if it is operated too rich in a stratified mode of operation, the mode switch is not allowed until the limit regarding normal operation in homogeneous, i.e., $\lambda=1$, has been fulfilled. However, the invention is not limited to this variant, as other strategies for selecting limit conditions are possible as long as a satisfactory operation of the engine through the entire mode switch can be accomplished.

Together with the amount of air flowing in gradually reaching its new level, the prevailing lambda value also turns inwards to the set value $\lambda_{set}$. This is because the fuel amount is predetermined according to the prevailing, nominal fuel control.

Accordingly, the control unit 5 is able to detect whether the prevailing lambda value $\lambda_h$ for the homogeneous mode of operation has been changed so that it is lower than a predetermined limit value $\lambda_1$, i.e., $\lambda_h < \lambda_1$, wherein the limit value $\lambda_1$ preferably is about 1.2. If this is the case (step 28), a switch to a homogeneous mode of operation (step 29) occurs. Thus, this implies that the amount of time for supplying fuel and air to the engine 1 and the amount of time for igniting the air/fuel mixture changes from a stratified to a homogeneous type.

The above-mentioned limit value $\lambda_1$ is predetermined. Preferably, the above-mentioned limit value $\lambda_1$ is about 1.2. More precisely, this limit value is selected as the highest value where a stable combustion in the engine 1 is provided during the mode switch. If a switch from stratified to homogeneous operating mode occurs at a too low limit value, an undesired carbon deposit from the engine 1 occurs. If, as described above, the switch occurs instead at a too high limit value (i.e., a too lean homogeneous mode of operation), an unstable combustion occurs, which can result in torque loss or engine misfire.

Finally, during a continuous change in the position of the gas throttle 13, with the intention of reaching the set value $\lambda_{set}$, the prevailing lambda value decreases to such extent that it is lower than a second predetermined limit value $\lambda_2$, i.e., $\lambda_h < \lambda_2$ (step 30). When this happens, the type of fuel control changes (step 31) and follows the air-based type of injection wherein the required amount of fuel for the respective moment of operation of the engine 1 is calculated based on the prevailing air flow to the engine 1. Limit value $\lambda_2$ is selected sufficiently low so that it do not result in too high of an addition of torque. Too high of an addition negatively affects comfort, since it is perceived as a jerk by the passengers of the vehicle.

When selecting the two limit values $\lambda_1$, $\lambda_2$, the following is taken into consideration. If the mode switch occurs at a too high lambda value $\lambda_h$, an unstable combustion will occur that can result in torque loss or misfire. If the switch of fuel control occurs at a too high lambda value $\lambda_h$, a torque change in the form of an undesired addition of torque will occur, which is a drawback for comfort, since it is perceived as a jerk for the passengers of the vehicle. Therefore, according to the invention, the switches occur at limit values which are adjusted in order to avoid these drawbacks.

With the invention, an essential advantage is provided in the form of a stable combustion in the engine during the mode switch. Also, an improved comfort is provided for the passengers in the vehicle in question. More precisely, by means of the invention, switches between the stratified and the homogeneous mode of operation (and any additional modes of operation which possibly will occur) are smooth and without jerks.

According to the invention, the same principles described above that are utilized during a switch from, for example, homogeneous to stratified mode of operation are utilized during the switch from stratified to homogeneous mode of operation. However, one difference is that the switch in fuel control (i.e., from air-based to nominal fuel control) occurs immediately after a switch to stratified mode of operation has been requested. When the lambda value exceeds a predetermined limit value corresponding to stable combustion and a switch without jerks, the engine is switched to the stratified mode of operation.

The invention is not limited to the embodiments described above and shown in the drawings. For example, the invention can be utilized without a pre-catalyst 19. Furthermore, the invention can be used in those cases where a $NO_x$ adsorbent and a conventional three-way catalyst are arranged as two separate components instead of the embodiment where the two components have been integrated into one single component in the form of a $NO_x$ adsorbing exhaust catalyst. The invention can also be utilized in connection with engines which do not have a $NO_x$ adsorbent.

As described above, the fuel control changes abruptly when the lambda values are sufficiently close to each other. However, the invention can also be utilized in a gradual transition from, for example, a nominal to an air-based fuel control, e.g., based on the prevailing lambda value.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A method of controlling a direct injection combustion engine, the method comprising the steps of:

generating an air/fuel mixture to the respective cylinders of the engine, switching between at least a first mode of operation and a second mode of operation of the engine by adjusting the air/fuel mixture supplied to the engine and the progress in time for the injection of said mixture, wherein the switching of operation mode is initiated in connection with operation of the engine with an air/fuel ratio mixture adjusted in such manner that correct operation of the engine is allowed in both operation modes during the switching, and carrying out the switch from the first to the second mode of operation at a lambda value corresponding to a required fuel amount and a prevailing amount of air flowing into the engine reaching a predetermined limit value.

2. The method according to claim 1 wherein the operation mode comprises at least a stratified and a homogeneous operation mode, and wherein the limit value is selected to correspond to a stable combustion in the engine substantially without any change in torque during the switch.

3. The method according to claim 1, further comprising the step of initiating switching between nominal and air-based fuel control to the engine when the lambda value reaches a second predetermined limit value.

4. The method according to claim 3, further comprising the step of selecting the second limit value so that substantially no additional torque from the engine is provided during the switch of fuel control.

5. The method according to claim 3 wherein the first and second limit values are separated from each other.

6. The method according to claim 1, further comprising the step of initiating switching at a driver-generated change of required torque from the engine.

7. The method according to claim 1, further comprising the steps of arranging the engine in connection with a $NO_x$ adsorbing exhaust catalyst, the exhaust catalyst being arranged in an exhaust system connected to the engine, and initiating the switch compulsory when a $NO_x$ regeneration of the exhaust catalyst is necessary.

8. An arrangement for controlling a direct injection combustion engine, the arrangement comprising:

a generator able to generate an air/fuel mixture to the respective cylinders of the engine, the generator further able to switch between at least a first mode of operation and a second mode of operation of the engine by adjusting the air/fuel mixture supplied to the engine and the amount of time for injection of the mixture, wherein the generator is adapted so that switching the mode of operation is initiated in connection with operation of the engine with an air/fuel mixture adjusted in such manner that correct operation of the engine is allowed in both modes of operation during the switch, and wherein the switch from the first mode to the second mode of operation is carried out at a lambda value corresponding to a required fuel amount and a prevailing amount of air flowing into the engine reaching a predetermined limit value.

* * * * *

UNITED STATES PATENT AND TRADEMARK OFFICE
CERTIFICATE OF CORRECTION

PATENT NO.    : 6,609,364 B2
DATED         : August 26, 2003
INVENTOR(S)   : Martin Litorell et al.

It is certified that error appears in the above-identified patent and that said Letters Patent is hereby corrected as shown below:

<u>Title page,</u>
Please add Item [30] as follows:

-- [30]         Foreign Application Priority Data

July 5, 1999         (SE) ..........................9902567-8 --

Signed and Sealed this

Twenty-third Day of December, 2003

JAMES E. ROGAN
*Director of the United States Patent and Trademark Office*